United States Patent
Wagener et al.

(10) Patent No.: US 10,747,698 B2
(45) Date of Patent: Aug. 18, 2020

(54) MASKING THE INFLUENCE OF UNSUPPORTED FIELDBUS COMMANDS

(71) Applicant: ABB Schweiz AG, Baden (CH)

(72) Inventors: Dirk Wagener, Stadthagen (DE); Christoph Welte, Neu-Ulm (DE); Marcus Heege, Kaisersesch (DE); Wolfgang Mahnke, Hettenleidelheim (DE); Marko Schlueter, Espelkamp (DE)

(73) Assignee: ABB SCHWEIZ AG, Baden (CH)

( * ) Notice: Subject to any disclaimer, the term of this patent is extended or adjusted under 35 U.S.C. 154(b) by 4 days.

(21) Appl. No.: 16/132,502

(22) Filed: Sep. 17, 2018

(65) Prior Publication Data
US 2019/0018812 A1    Jan. 17, 2019

Related U.S. Application Data

(63) Continuation of application No. PCT/EP2017/056468, filed on Mar. 17, 2017.

(30) Foreign Application Priority Data

Mar. 18, 2016 (DE) .................. 10 2016 105 136

(51) Int. Cl.
| | |
|---|---|
| *G06F 13/38* | (2006.01) |
| *H04L 12/40* | (2006.01) |
| *G05B 19/042* | (2006.01) |
| *G06F 13/42* | (2006.01) |

(52) U.S. Cl.
CPC ....... *G06F 13/387* (2013.01); *G05B 19/0423* (2013.01); *G06F 13/4234* (2013.01); *H04L 12/40* (2013.01); *H04L 12/40013* (2013.01); *G05B 2219/25428* (2013.01); *H04L 2012/4026* (2013.01)

(58) Field of Classification Search
None
See application file for complete search history.

(56) References Cited

U.S. PATENT DOCUMENTS

| | | | | |
|---|---|---|---|---|
| 5,826,053 A | * | 10/1998 | Witt | .................... G06F 9/30149 |
| | | | | 712/210 |
| 9,766,972 B2 | * | 9/2017 | Davis | ................ H03M 13/3761 |
| 10,019,303 B2 | | 7/2018 | Uhde et al. | |

(Continued)

FOREIGN PATENT DOCUMENTS

| | | |
|---|---|---|
| DE | 102010021640 A1 | 12/2011 |
| DE | 102013106954 A1 | 1/2015 |

(Continued)

*Primary Examiner* — Henry Tsai
*Assistant Examiner* — Christopher A Bartels
(74) *Attorney, Agent, or Firm* — Leydig, Voit & Mayer, Ltd.

(57) ABSTRACT

A control or test system for a field device includes: a communication unit for bidirectionally commmunicating with the field device via a fieldbus protocol; a command memory for receiving commands that are transmittable to the field device via the fieldbus protocol; and a masking memory, which masking memory receives the commands contained in the command memory that are not supported by the field device, and/or receives an error message returned by the field device in response to such command.

14 Claims, 3 Drawing Sheets

(56) References Cited

U.S. PATENT DOCUMENTS

| | | | |
|---|---|---|---|
| 2003/0088805 A1* | 5/2003 | Majni | G06F 11/108 |
| | | | 714/5.1 |
| 2008/0307180 A1* | 12/2008 | Hattori | G06F 9/45558 |
| | | | 711/163 |
| 2009/0010205 A1* | 1/2009 | Pratt, Jr. | G01D 21/00 |
| | | | 370/328 |
| 2010/0005218 A1* | 1/2010 | Gower | G06F 13/4234 |
| | | | 711/5 |
| 2010/0174955 A1* | 7/2010 | Carnevale | G11C 5/04 |
| | | | 714/718 |
| 2014/0208084 A1* | 7/2014 | Yap | G06F 9/30 |
| | | | 712/234 |
| 2015/0250025 A1 | 9/2015 | Bach et al. | |

FOREIGN PATENT DOCUMENTS

| | | |
|---|---|---|
| EP | 2913735 A2 | 9/2015 |
| WO | WO 2011057964 A1 | 5/2011 |

\* cited by examiner

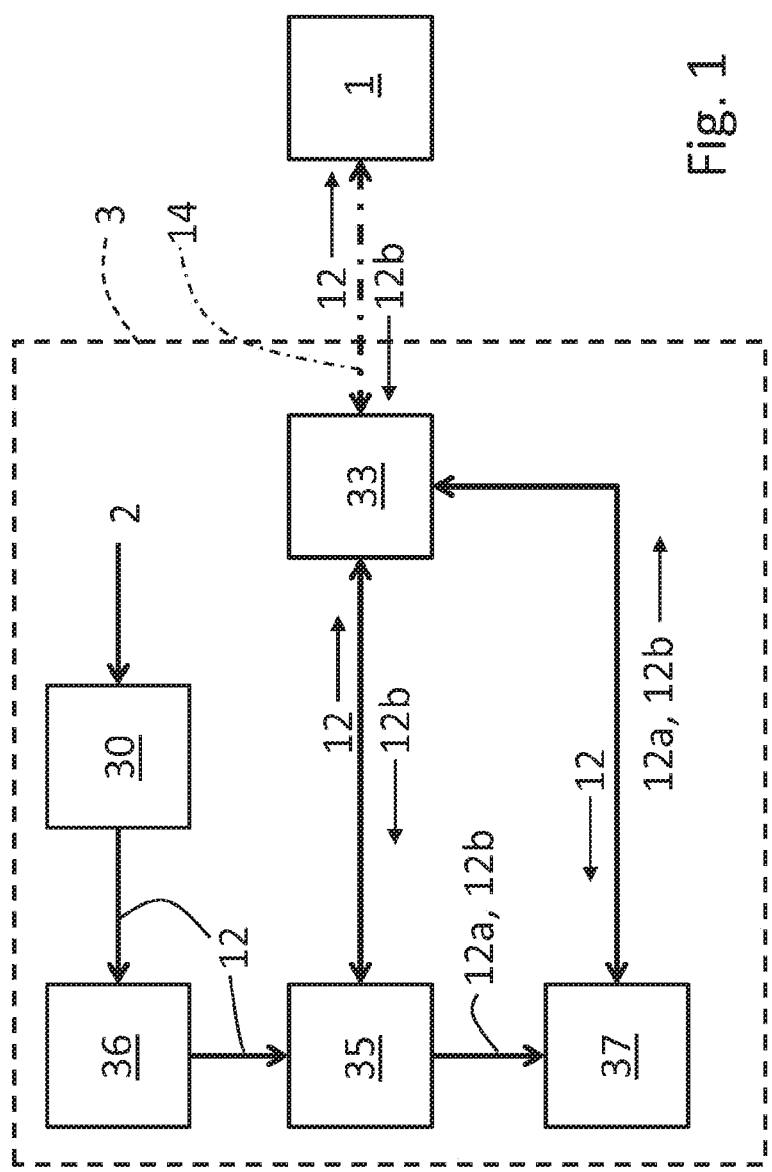

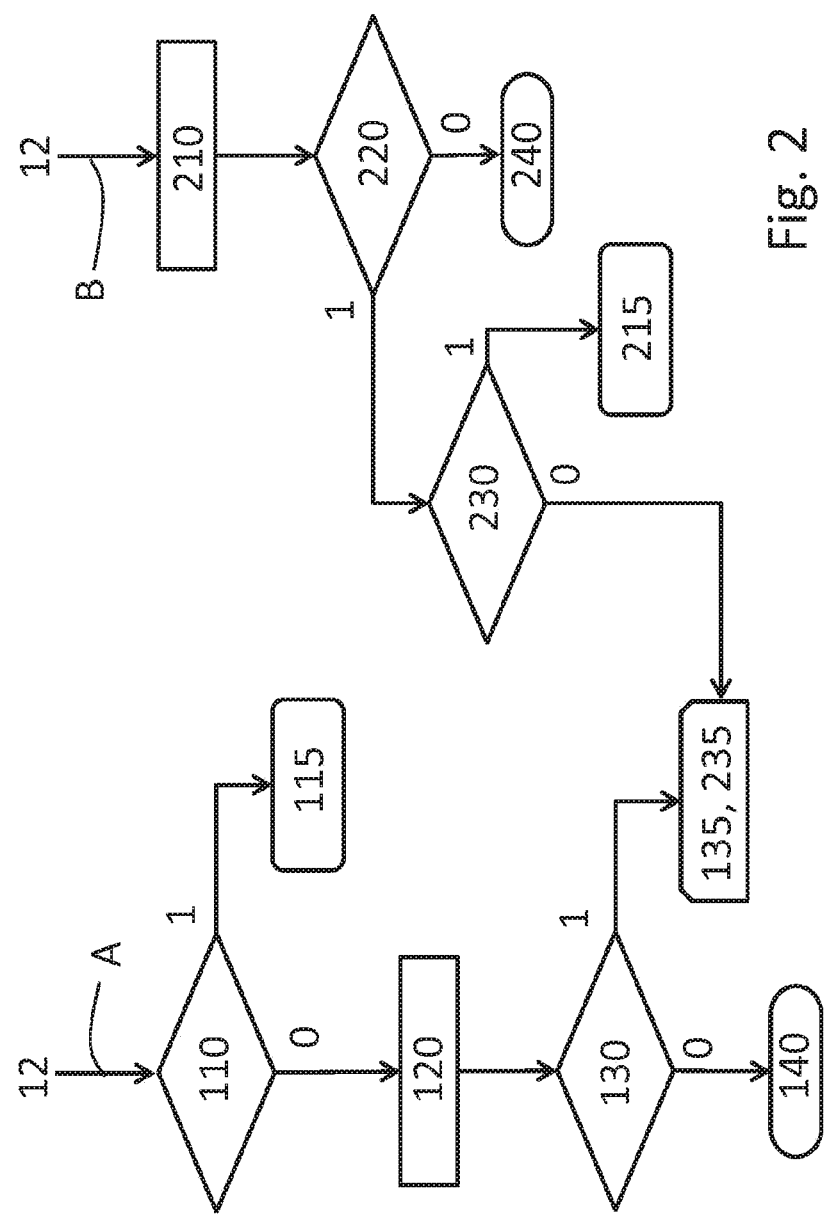

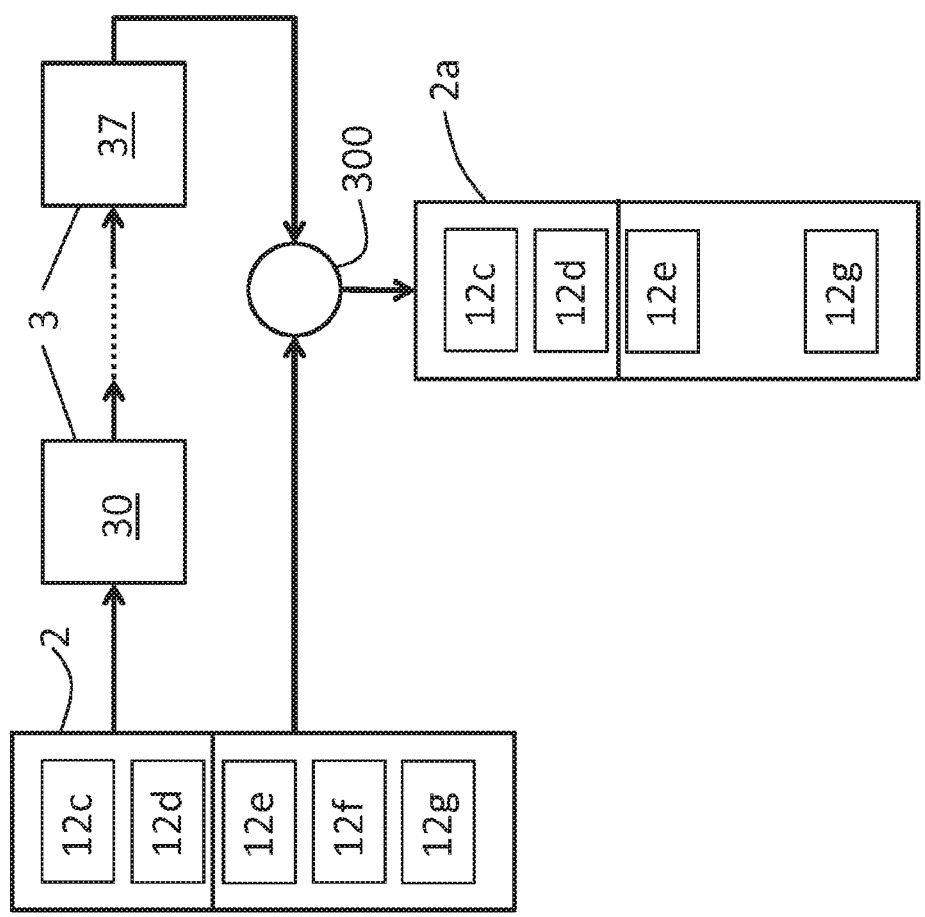

MASKING THE INFLUENCE OF UNSUPPORTED FIELDBUS COMMANDS

CROSS-REFERENCE TO PRIOR APPLICATION

This application is a continuation of International Patent Application No. PCT/EP2017/056468, filed on Mar. 17, 2017, which claims priority to German Patent Application No. DE 10 2016 105 136.5, filed on Mar. 18, 2016. The entire disclosure of both applications is hereby incorporated by reference herein.

FIELD

The invention relates to a control or test system for a field device, to a method for the operation thereof, and to a computer program product.

BACKGROUND

Field devices for industrial facilities are generally connected to a fieldbus in order to be able to receive commands from a control system via a fieldbus protocol. In order to facilitate the connection to the control system, the manufacturer of the field device often also delivers an electronic device description that contains available commands and parameters, and optionally also specifications for the domain logic and/or for the user interface.

Some fieldbus protocols already contain more or less extensive cross-device and cross-manufacturer standardization. The fieldbus protocol standard can thus specify a set of commands, for example, which commands must necessarily be supported by a standards-compliant field device. The standard may also define a further set of commands, the function and syntax of which are fixed, but which do not necessarily have to be supported by every standards-compliant field device. A generic device description, by means of which most standards-compliant field devices can be operated, can be formulated from these commands that necessarily must be supported and that are optionally to be supported but that are otherwise unified.

If a generic device description of this kind is used for a field device, or if another device description not originating from the manufacturer of the field device is used, it may be the case that a command that is defined therein and is optionally to be supported is not supported by the field device. The field device responds to a command of this kind with an error message. In an industrial facility comprising a plurality of field devices, irrelevant error messages of this kind accumulate to form a noise level in which the relevant error messages may be lost. This impairs the overview of the status of the field devices in the industrial facility.

SUMMARY

In an embodiment, the present invention provides a control or test system for a field device, comprising: a communication unit configured to bidirectionally communicate with the field device via a fieldbus protocol; a command memory configured to receive commands that are transmittable to the field device via the fieldbus protocol; and a masking memory, which masking memory is configured to receive the commands contained in the command memory that are not supported by the field device, and/or to receive an error message returned by the field device in response to such command.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1: schematically shows the structure of an embodiment of a control or test system 3 according to the invention.

FIG. 2: shows alternative control flows for preventing unnecessary error messages 12b.

FIG. 3: shows the generation 300 of a device-specific device description 2a from a generic device description 2.

DETAILED DESCRIPTION

The problem addressed by the invention is therefore that of improving the overview of the status of field devices in an industrial facility.

Within the context of the invention, a control or test system for a field device has been developed. Said system comprises a communication unit for bidirectional communication with the field device via a fieldbus protocol. Furthermore, a command memory is provided which is designed for receiving commands that can be transmitted to the field device via the fieldbus protocol.

According to the invention, a masking memory is additionally provided, which memory is designed for receiving the commands contained in the command memory that are not supported by the field device, and/or for receiving an error message returned by the field device in reaction to a command of this kind.

It has been found that the additional information contained in the masking memory can prevent errors occurring as a result of unsupported commands. Alternatively or in combination therewith, the disadvantageous effect of errors of this kind on the overview of the device status within the industrial facility can be reduced. If, for example, the sending of unsupported commands to the field device is intentionally prevented, errors do not occur at all. If errors are retrospectively checked for whether they originate from the sending of an unsupported command to a field device, error messages can be classified accordingly, such that the overview of the device status does not suffer.

In both cases, the result is that generic or other device descriptions not originating from the manufacturer of the field device can be used without this needing to be offset by the disadvantage of a high noise level of error messages in the industrial facility. In particular, it is practical in this respect to use one uniform, generic device description for a large number of field devices. It is then necessary to maintain only this one device description, and not one device description per device type and manufacturer.

The specific source from which the information in the command memory and in the masking memory originates in each case is irrelevant for this effect. Both memories may for example already be pre-filled with the relevant information. Alternatively or in combination therewith, the control or test system may be designed to actively determine the information for the command memory and the masking memory.

In particular, a control system may interact with a test system in that the test system initially actively determines the information for the command memory and/or the masking memory of the test system, in order to then transmit said information to the command memory or to the masking memory of the control system in the following step.

A parser is advantageously provided, which parser is designed to extract the commands that can be transmitted to the field device from a device description and to store said commands in the command memory. Said device description does not have to be provided especially for the specific field device, but rather can in particular be a generic device description. The device description may in particular contain a superset of the commands supported by the field device. However, said description does not necessarily have to contain all the commands supported by the field device. If a command supported by the field device is missing from the device description, this does not trigger an error, but instead merely causes the corresponding function of the field device to be dormant.

According to a particularly advantageous embodiment of the invention, an analysis unit is additionally provided, which unit is designed to send commands stored in the command memory to the field device via the fieldbus protocol and, upon receiving an error message from the field device, to store the command in the masking memory as a command that is not supported by the field device. Alternatively or in combination therewith, the analysis unit may be designed such that, upon receiving an error message, said unit stores the error message itself in the masking memory.

It is thus possible to establish an initial connection to the field device for example, in order to successively test all the command memories from the command memory with regard to whether said commands function in an error-free manner. In this case, the command memory may in particular contain a set of commands that have been obtained from a generic device description not written especially for the specific field device. The device description may even be so general that it relates to devices having completely different functions. For example, the generic device description may relate both to sensors and to actuators.

In this connection, it is particularly advantageous to obtain the information for the masking memory using a test system, and to subsequently transfer said information to the masking memory of the actual control system. If, for example, all the commands retrieved from a generic device description are tested, these may also contain commands to which the field device immediately reacts with an action, for example closing a valve. This action may be undesirable in ongoing operation of the industrial facility. However, if the field device is coupled only to a test system, actions triggered by the tested commands may possibly not have any effect on the operation of the industrial facility. The knowledge obtained regarding the supported commands, which knowledge is stored in the masking memory of the test system, is valid for all field devices of the same type.

According to a further advantageous embodiment of the invention, the analysis unit is additionally designed to check whether an unsupported command is defined by the fieldbus protocol standard as a command that "must be supported", and optionally to report an error. In this way, it is possible to identify a fault in the field device that relates to a specific functionality and causes an error message when said functionality is used. In addition, it is also possible to check whether the field device is still compliant with the current version of the fieldbus protocol standard. Field devices may have very long lives, in particular if they are, for example, sensors that do not comprise any moving parts. The lifetime thereof may be longer than the cycle in which the fieldbus protocol standard is revised. The situation may therefore arise in which the field device is compliant with the standard at the time of installation, but during subsequent revision of the standard for example a command that was previously optionally to be supported is then specified as "must be supported". If the field device does not support said command it ceases to be compliant with the standard, without the field device itself changing, and must therefore be replaced. Carrying out a corresponding check using the analysis unit makes it possible to detect whether a replacement of this kind has been omitted. It is thus possible to identify and remove a source for error functions that are otherwise difficult to locate.

In a particularly advantageous embodiment of the invention, the control or test system is designed to check, before a command stored in the command memory is transmitted to the field device, whether the command is stored in the masking memory as an unsupported command and/or whether an error message relating thereto is stored in the masking memory. The system optionally suppresses the transmission of the command to the field device. This prevents errors being caused by unsupported commands being sent to the field device.

In this connection, too, it is particularly advantageous to obtain the information for the masking memory using a test system, and to subsequently transfer said information to the masking memory of the actual control system. When determining the unsupported commands by testing all the commands available according to the command memory, error messages are necessarily generated. If this test is carried out in a networked industrial facility, said error messages may reach other control components and trigger an undesired reaction there, such as a safety shutdown. This is difficult to assess in advance. It is therefore possible only to a limited extent to prepare other control components for the sudden cumulative occurrence of error messages.

Optionally, a reading command, the transmission of which to the field device was suppressed, may be marked in the configuration software, and/or it is possible to report back in another manner that reading could not be carried out. It is thus possible to prevent the control system performing further calculations using an unspecified value that it believes to have read from the field device, and obtaining nonsensical results in the process.

In a further particularly advantageous embodiment of the invention, the control or test system is designed to clean up from the command memory those commands which are stored in the masking memory and/or which have resulted in an error message being stored in the masking memory. It is then no longer necessary, in order to prevent errors, to additionally query the masking memory each time before a command is called up from the command memory, and this increases performance. Furthermore, the cleaned-up contents of the command memory can be used for example to create a new device description that is specific for the field device type.

In addition to the commands that can be transmitted to the field device via the fieldbus protocol, the command memory may in particular for example also contain abstract commands in the language of the device description. In the context of the device description, the arguments of said abstract commands may contain assigned parameter names that are reproduced, by the device description, on the physical parameters of the field device. Cleaning up the command memory may then also have an effect on the list of parameter names for example. If, for example, the field device only supports a command for reading the parameter, but not a command for writing said parameter, the corresponding parameter name can be marked as "only readable, but not writeable". If the field device does not support either a command for writing a specific parameter or a command for reading said parameter, the corresponding parameter name can be completely removed.

In a further particularly advantageous embodiment of the invention, the control or test system is designed to check, before an error message is issued or logged, whether the error message is stored in the masking memory and/or relates to an unsupported command stored in the masking memory. Issuing or logging of the error message is optionally suppressed.

Error messages therefore still occur if unsupported commands are sent to the field device, but the impacts of said error messages on the overview of the status of the field devices are reduced. The procedure of first allowing errors and only retrospectively classifying error messages is advantageous in that it is not necessary to intervene in the actual control flow of the control system.

The error messages do not necessarily have to be classified and filtered before they are logged for the first time. For example, all the error messages can first be collected in a protocol and subsequently checked with regard to whether they result from an unsupported command being sent to the field device only when issued to the user. In this way, the information regarding how frequently an unsupported command is called up is not completely discarded. Said information is of secondary importance for monitoring the ongoing operation of the industrial facility. However, if a specific unsupported command is called up frequently, this can be assessed as a signal that the field device should be replaced, in the medium term, by a higher-quality device that also supports the frequently called up additional command.

In a particularly advantageous embodiment of the invention, the fieldbus protocol is a HART protocol according to the fieldbus standard IEC 61158. The vast majority of field devices today communicate via the HART protocol. HART is a bidirectional data transfer protocol that allows access to the data of intelligent field systems and the host systems thereof. In this case, a host may be any application, from a handheld device used by service personnel, to a laptop, to controllers, control systems having asset management functions, and security and other systems.

The HART specification defines three different classes of commands:
"Universal"—these commands have to be fully supported by each HART-compliant device, according to a fixed specification.
"Common Practice"—if said commands are supported by the field device, a fixed specification must be adhered to. However, it is optional as to whether a field device supports said commands.
"Device Specific"—these commands can be freely defined by the manufacturer of the field device. Said commands therefore also vary from manufacturer to manufacturer in devices having the same function.

This division of the specification makes it possible to compile generic device descriptions (also referred to as universal device descriptions) that can be used for most HART field devices today. Said generic device descriptions are independent of the field device and manufacturer, and are typically based on the HART commands of the "Universal" and "Common Practice" classes. In this case, all the commands of the "Universal" class are implemented, but in general only some of the commands of the "Common Practice" class.

The generic device description may be used in particular in the field device configuration software in order to communicate with field devices for which a device description delivered by the manufacturer is not available. However, it may also be expedient for example to use a generic description of this kind throughout an industrial facility in order to prevent coexistence of too many different device descriptions.

Most HART field devices today can thus also carry out their essential function when exclusively HART commands of the "Universal" and "Common Practice" classes are used for the actuation thereof. It is thus possible for said devices to also be operated without a manufacturer-specific device description.

In a further particularly advantageous embodiment of the invention, the device description is an electronic device description, EDD, a device description according to the electronic device description language, EDDL, and/or a device description according to the foundation fieldbus standard, CFF. An EDD, specifically, is characterized by the fact that it contains an abstract description in text form having a specified syntax, and does not contain any executable program code. An EDD can thus be used and manipulated in a platform-independent manner. For example, an EDD can be used both by a test system that determines the information for the masking memory, and later by the actual control system. In this case, the EDD can also be modified using information obtained for the masking memory. The information stored in the masking memory of the test system can then be supplied to the actual control system via the EDD for example, such that the control system can use this information without itself requiring a masking memory.

In general, the invention therefore also relates to a method for operating a control or test system. Said method is wherein a device description generic for the fieldbus protocol standard is supplied to the parser, which description contains all the commands that are defined according to the standard as "must be supported", and at least one command that is defined according to the standard as "optionally to be supported".

In a further particularly advantageous embodiment of the invention, following the above, a specific device description is generated from the device description and the content of the masking memory, which specific description contains only those commands that are supported by the field device.

The control or test system and the method according to the invention can in particular be computer-implemented completely or in part. In particular, the analysis unit may be computer-implemented. The invention therefore also relates to a computer program product comprising machine-readable instructions which, when executed by a computer and/or a controller, form the computer or the controller into a control or test system and/or into an analysis unit. Alternatively or in combination therewith, the machine-readable instructions can also prompt the computer or the controller to carry out a method according to the invention.

FIG. 1 shows an embodiment of a control or test system 3 that communicates in a bidirectional manner with a field device 1 via a communication unit 33 and a fieldbus protocol 14. The system 3 comprises a parser 30 that extracts the available commands 12 from a device description 2, for example an EDD, and stores said commands in the command memory 36.

An analysis unit 35 successively tests all the commands 12 stored in the command memory 36 by sending each of said commands 12 to the field device 1, via the fieldbus protocol 14 and in a manner communicated by the communication unit 33, and checks whether the field device 1 then returns an error message 12b. If an error message 12b of this kind occurs, the analysis unit 35 stores the command 12 that triggered the error message 12b as an unsupported command 12a in the masking memory 37 of system 3. Alternatively or in combination, the error message 12b is stored in the masking memory 37.

The communication unit 33 provides the function of communication of all the functional units of the control system 3 with the field device 1. For the sake of clarity, said further functional units, such as a user interface and a domain logic, are not shown in FIG. 1. If the communication unit 33 receives a command 12, it does not immediately transmit said command 12 to the field device 1 via the fieldbus protocol 14, but instead initially queries, in the masking memory 37, whether the command 12 is stored there as an unsupported command 12 and/or whether an error message 12b relating to the command 12 is stored there. The communication unit 33 optionally suppresses the transmission of the command 12 to the field device 1. The generation of unnecessary error messages 12b is thus prevented.

FIG. 2 shows two alternative control flows A and B, by means of which it is possible to prevent unnecessary error messages 12b accumulating in a control system 3 owing to unsupported commands 12a being sent to a field device 1. In each case, the starting point is a command 12 that is intended to be transmitted to the field device 1.

According to control flow A, a check is first made, in step 110, as to whether the command 12 is stored in the masking memory 37 as an unsupported command 12a and/or whether an error message 12b relating to the command 12 is stored in the masking memory 37. Optionally (truth value 1), transmission of the command 12 to the field device 1 is suppressed in step 115. The accumulation of unnecessary further error messages 12b is thus prevented.

If the command 12 was not identified, in step 110, as an unsupported command 12a (truth value 0), said command is transmitted to the field device 1 in step 120. Subsequently, a check is carried out, in step 130, as to whether the field device 1 has returned an error message 12b. If this is the case (truth value 1), said error message 12b cannot have been caused by the command 12 being an unsupported command 12a. Instead, the error message 12b must have been caused by a problem arising during implementation of the command 12, which implementation is per se provided in the field device 1. Therefore, the error message 12b is issued and/or logged in step 135. If, in contrast, no error message 12b is identified (truth value 0) in step 130, control flow A is then concluded, by step 140, as having been successful.

According to control flow B, the command 12 is transmitted to the field device 1 in step 210. Subsequently, a check is carried out, in step 220, as to whether the field device 1 has returned an error message 12b. If this is the case (truth value 1), a check is made, in step 230, as to whether the error message 12b is stored in the masking memory 37 and/or whether the command 12 is stored in the masking memory 37 as an unsupported command 12a. If this is the case (truth value 1), issuing and/or logging of the error message 12b is suppressed in step 215.

If the field device 1 has returned an error message 12b (truth value 1 in step 220), but neither the command 12 nor the error message 12b is stored in the masking memory 37 (truth value 0 in step 230), the error message 12b does not result from the command 12 not being supported by the field device 1. Instead, a problem has arisen during implementation of the command 12, which implementation is per se provided by the field device 1. Therefore, similarly to the corresponding situation in control flow A, the error message 12 is issued and/or logged in step 235.

If no error message was identified (truth value 0) in step 220, control flow B is then concluded, by step 240, as having been successful.

FIG. 3 shows, on the basis of an example, the generation 300 of a device-specific device description 2a from a generic device description 2. The generic device description 2, for example a generic HART-EDD, contains five commands 12c-12g. The commands 12c and 12d belong to the "Universal" class of HART commands, and must therefore be supported by every field device 1 that is compliant with the HART standard. The commands 12e, 12f and 12g belong to the "Common Practice" class, and are therefore defined but do not necessarily have to be implemented by every field device 1.

The device description 2 is supplied to a test system 3 which is constructed in a manner similar to FIG. 1. For reasons of clarity, only the parser 30 on the input side and the masking memory 37 of which the contents are used are shown in FIG. 3.

In the example shown in FIG. 3, checking all the commands 12c-12g shows that the field device 1 supports all the commands 12 apart from command 12f. Accordingly, said command 12f is stored in the masking memory 37 as an unsupported command 12a.

In step 300, the original generic device description 2 and the contents of the masking memory 37 are set against one another in order to generate the device-specific device description 2a. The result is that the device-specific device description 2a no longer contains the command 12f that is not supported by the field device 1.

The device-specific device description 2a can subsequently be installed for example in a control system 3 in order to ensure that said control system 3 transmits to the field device 1 only commands 12 that are supported by the field device 1. Since the unsupported command 12f is missing from the device description 2a, the control system 3 is not prompted to transmit said command to the field device 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 field device
2 device description
2a device-specific version of the device description 2
3 control or test system
12 command
12a command 12 not supported by the field device 1
12b error message from field device 1
12c, 12d commands 12 that must be supported, according to the fieldbus protocol 14
12e-12g commands 12 that are optionally to be supported, according to the fieldbus protocol 14
14 fieldbus protocol
30 parser of the system 3
33 communication unit of the system 3
35 analysis unit of the system 3
36 command memory of the system 3
37 masking memory of the system 3
110, 230 check as to whether the command 12 is known as "unsupported"
115 suppression of transmission 120
120, 210 transmission of the command 12 to the field device 1
130, 220 check as to whether the field device 1 has issued an error message 12b
135, 235 issuing and/or logging of the error message 12b
140, 240 successful conclusion of control flow A and B, respectively
215 suppression of the error message 12b
300 generation of the device-specific device description 2a
A, B control flows

What is claimed is:

1. A control or test system for a field device, comprising:
a communication unit configured to bidirectionally communicate with the field device via a fieldbus protocol;
a command memory configured to receive commands that are transmittable to the field device via the fieldbus protocol;
a masking memory configured to receive commands contained in the command memory that are not supported by the field device, and/or to receive an error message returned by the field device in response to the commands contained in the command memory that are not supported by the field device; and
an analysis unit, which analysis unit is configured to send commands stored in the command memory to the field device via the fieldbus protocol and, upon receiving an error message from the field device that originates from a command sent to the field device that was not supported by the field device, to store the command in the masking memory as a command that is not supported by the field device and/or to store the error message in the masking memory.

2. The control or test system according to claim 1, further comprising a parser, which parser is configured to extract commands that are transmittable to the field device from a device description and to store the commands in the command memory.

3. The control or test system according to claim 2, wherein the device description comprises an electronic device description, EDD, according to the electronic device description language, EDDL, and/or a device description according to the foundation fieldbus standard, CFF.

4. A method for operating the control or test system according to claim 2, comprising:
supplying a device description generic for the fieldbus protocol standard to the parser, which description contains all commands that are defined according to the standard as "must be supported", and at least one command that is defined according to the standard as "optionally to be supported".

5. The method according to claim 4, further comprising generating a specific device description from the device description and the content of the masking memory, which specific device description contains only those commands that are supported by the field device.

6. A computer program product containing machine-readable instructions which, when executed by a computer or a controller, configure the computer or the controller into the control or test system and/or into the analysis unit, and/or prompt the computer or the controller to carry out the method according to claim 4.

7. The control or test system according to claim 1, wherein the analysis unit is additionally configured to check whether an unsupported command is defined by the fieldbus protocol standard as a command that "must be supported."

8. The control or test system according to claim 7, wherein if the unsupported command is defined by the fieldbus protocol standard as the command that "must be supported," the analysis unit is additionally configured to report an error.

9. The control or test system according to claim 1, wherein the system is configured to check, before a command stored in the command memory is transmitted to the field device, whether the command is stored in the masking memory as an unsupported command and/or whether an error message relating thereto is stored in the masking memory.

10. The control or test system according to claim 9, wherein the system is configured to suppress transmission of the command to the field device.

11. The control or test system according to claim 1, wherein the system is configured to clean up from the command memory commands which are stored in the masking memory and/or which have resulted in an error message being stored in the masking memory.

12. The control or test system according to claim 1, wherein the system is configured to check, before an error message is issued or logged, whether the error message is stored in the masking memory and/or relates to an unsupported command stored in the masking memory.

13. The control or test system according to claim 12, wherein the system is configured to suppress the issuing or logging of the error message.

14. The control or test system according to claim 1, wherein the fieldbus protocol comprises a HART protocol according to fieldbus standard IEC 61158.

* * * * *